United States Patent
King et al.

(10) Patent No.: US 11,842,200 B2
(45) Date of Patent: Dec. 12, 2023

(54) MULTI-MODAL GATHER OPERATION

(71) Applicant: ADVANCED MICRO DEVICES, INC., Santa Clara, CA (US)

(72) Inventors: John M. King, Austin, TX (US); Magiting Talisayon, Boxborough, MA (US); Michael Estlick, Fort Collins, CO (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 16/586,247

(22) Filed: Sep. 27, 2019

(65) Prior Publication Data

US 2021/0096858 A1 Apr. 1, 2021

(51) Int. Cl.
*G06F 9/38* (2018.01)
*G06F 9/30* (2018.01)

(52) U.S. Cl.
CPC .......... *G06F 9/3887* (2013.01); *G06F 9/3013* (2013.01); *G06F 9/30018* (2013.01); *G06F 9/30036* (2013.01); *G06F 9/30043* (2013.01); *G06F 9/3861* (2013.01)

(58) Field of Classification Search
CPC .. G06F 9/3885; G06F 9/3887; G06F 9/30043; G06F 9/3861; G06F 9/30036; G06F 9/30018
See application file for complete search history.

(56) References Cited

U.S. PATENT DOCUMENTS

| | | | |
|---|---|---|---|
| 9,396,056 B2* | 7/2016 | Sperber | G06F 9/3861 |
| 2005/0273576 A1* | 12/2005 | Wilson | G06F 9/30036 711/217 |
| 2009/0172365 A1* | 7/2009 | Orenstien | G06F 9/3842 712/225 |
| 2012/0117420 A1* | 5/2012 | Goveas | G06F 9/30036 714/15 |
| 2013/0326160 A1* | 12/2013 | Sperber | G06F 9/345 711/154 |

(Continued)

FOREIGN PATENT DOCUMENTS

GB 2392998 A * 3/2004 ......... G06F 9/30043

OTHER PUBLICATIONS

Neal C. Crago, Mark Stephenson, and Stephen W. Keckler, "Exposing Memory Access Patterns to Improve Instruction and Memory Efficiency in GPUs", October, ACM, pp. 45:2-45:21 (Year: 2018).*

*Primary Examiner* — Courtney P Carmichael-Moody

(57) ABSTRACT

An apparatus includes a plurality of load buses and a load store unit that includes a plurality of load ports to access the plurality of load buses. The load store unit performs a gather operation to concurrently gather a plurality of subsets of data from a memory via the plurality of load buses in a first mode. The apparatus also includes a register that is partitioned into a plurality of portions to hold the plurality of subsets of data provided by the load store unit. The load store unit ignores exceptions or faults while performing the gather operation in the first mode and transitions to a second mode in response to an exception or fault. Two lanes are dispatched to concurrently perform the gather operation per clock cycle in the first mode and a single lane is dispatched to perform the gather operation per clock cycle in the second mode.

20 Claims, 7 Drawing Sheets

(56) References Cited

U.S. PATENT DOCUMENTS

2015/0032929 A1* 1/2015 Zamsky ............... G06F 13/16
710/305
2019/0340054 A1* 11/2019 Boettcher ............ G06F 9/3889

* cited by examiner

MULTI-MODAL GATHER OPERATION

BACKGROUND

Processing systems often include coprocessors, such as floating-point units (FPUs), to supplement the functions of a central processing unit (CPU) or other primary processor. For example, an FPU executes mathematical operations such as addition, subtraction, multiplication, division, other floating-point instructions including transcendental operations, bitwise operations, and the like. The FPU performs gather operations to bring together data from disparate locations to a single location such as a register. The gather operation represents a sparsely populated vector using two smaller vectors: (1) a gather vector that includes the populated values from the sparse vector and (2) an index vector that includes the indexes of the populated values in the sparse vector. For example, eight 64-bit values are gathered into a 512 bit gather vector and an index vector that includes eight 64-bit indexes. The gather operation is a load operation and each lane in the processing unit is provided a different address (or offset) that indicates a memory location including a value that is to be loaded into the gather vector. For example, if the FPU includes eight lanes, each lane uses an address to load one of the eight 64-bit values into the 512 bit gather vector. The offsets are the indexes of the values and are stored in the index vector. A separate micro operation is used to generate addresses for each of the lanes.

BRIEF DESCRIPTION OF THE DRAWINGS

The present disclosure is better understood, and its numerous features and advantages made apparent to those skilled in the art by referencing the accompanying drawings. The use of the same reference symbols in different drawings indicates similar or identical items.

DETAILED DESCRIPTION

A gather operation performed in multiple lanes of a floating-point unit (FPU) potentially generates exceptions or page faults in all the available lanes, e.g., eight different exceptions or page faults are potentially generated by eight lanes in the FPU. Conventional FPUs use partial updating to ensure that at least one lane completes the gather operation per cycle. For example, the lanes that perform the gather operation are indicated by a mask. If the lanes perform the gather operation in a low-to-high order and a page fault occurs during the gather operation performed by lane 5, the data that was successfully gathered by lanes 1-4 is stored in a register that holds the gather vector. The mask is then modified to indicate that lanes 1-4 do not perform the gather operation in subsequent iterations. Exception handling is used to deal with the page fault in lane 5. The gather operation is then replayed and performed in order by the remaining lanes, as indicated by the mask. The partial update procedure iterates until all the lanes complete the gather operation. Thus, the requirements of exception handling for the gather operation cause a bottleneck that sets a one lane per clock cycle limit for dispatch of the gather operation.

FIGS. 1-7 disclose embodiments of an FPU that reduces the effects of the bottleneck caused by the exception handling requirements of a gather operation by leveraging multiple load buses in the FPU. Some embodiments of the FPU implement two load buses and a load store unit in the FPU has two corresponding load ports that are used to load data concurrently via the load buses. Lanes of the FPU and a destination register that holds the gathered data are partitioned into multiple subsets, e.g., an even subset that holds the data gathered by even lanes and an odd subset that holds the data gathered by odd lanes. In a first operation mode, exceptions/faults are ignored. The subsets of the lanes perform the gather operation concurrently and hold data in the destination register using the corresponding load buses and load ports in the load store unit. If the FPU implements two load buses and two load ports, two lanes are dispatched per clock cycle. Partial updates are not performed because the exceptions or faults are ignored in the first operation mode. A second operation mode is triggered in response to detecting an exception or page fault. In the second operation mode, partial updating is performed to address the detected exception or page fault. A single lane is dispatched per clock cycle in the second operation mode.

Figure 1:
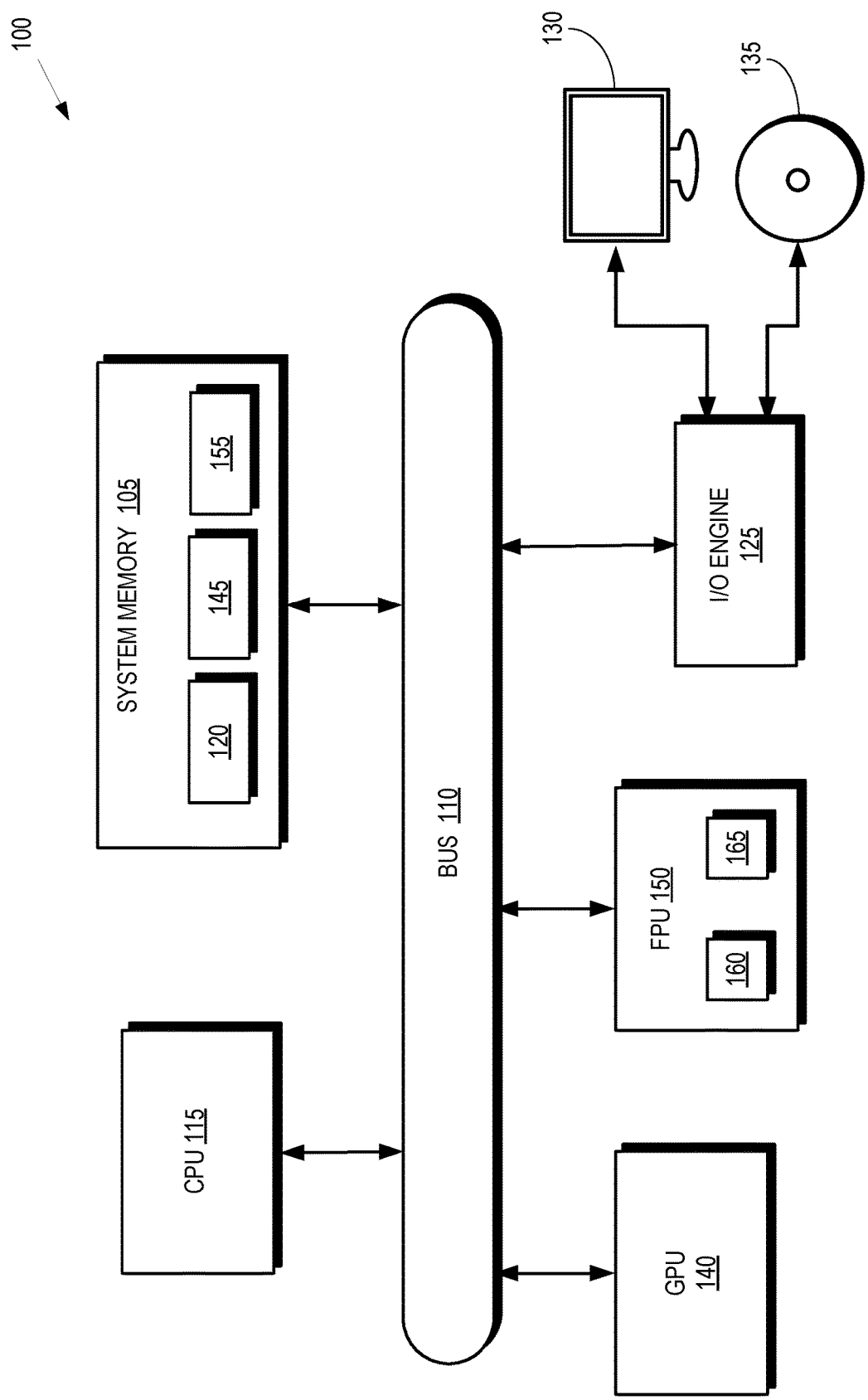
FIG. 1 is a block diagram of a processing system that supports a multimodal gather operation according to some embodiments.

FIG. 1 is a block diagram of a processing system 100 that supports a multimodal gather operation according to some embodiments. The processing system 100 includes or has access to a system memory 105 or other storage component that is implemented using a non-transitory computer readable medium such as a dynamic random access memory (DRAM). However, some embodiments of the memory 105 are implemented using other types of memory including static random access memory (SRAM), nonvolatile RAM, and the like. The processing system 100 also includes a bus 110 to support communication between entities implemented in the processing system 100, such as the memory 105. Some embodiments of the processing system 100 include other buses, bridges, switches, routers, and the like, which are not shown in FIG. 1 in the interest of clarity.

The processing system 100 includes a central processing unit (CPU) 115. Some embodiments of the CPU 115 include multiple processing elements (not shown in FIG. 1 in the interest of clarity) that execute instructions concurrently or in parallel. The processing elements are referred to as processor cores, compute units, or using other terms. The CPU 115 is connected to the bus 110 therefore communicates with the memory 105 via the bus 110. The CPU 115 executes instructions such as program code 120 stored in the memory 105 and the CPU 115 stores information in the memory 105 such as the results of the executed instructions. The CPU 115 is also able to initiate graphics processing by issuing draw calls.

An input/output (I/O) engine 125 handles input or output operations associated with a display 130, as well as other elements of the processing system 100 such as keyboards, mice, printers, external disks, and the like. The I/O engine 125 is coupled to the bus 110 so that the I/O engine 125 communicates with the memory 105, the CPU 115, or other entities that are connected to the bus 110. In the illustrated embodiment, the I/O engine 125 reads information stored on an external storage component 135, which is implemented using a non-transitory computer readable medium such as a compact disk (CD), a digital video disc (DVD), and the like. The I/O engine 125 also writes information to the external storage component 135, such as the results of processing by the CPU 115.

The processing system 100 includes a graphics processing unit (GPU) 140 that renders images for presentation on the display 130. For example, the GPU 140 renders objects to produce values of pixels that are provided to the display 130, which uses the pixel values to display an image that represents the rendered objects. Some embodiments of the GPU 140 are used for general purpose computing. In the illustrated embodiment, the GPU 140 communicates with the memory 105 (and other entities that are connected to the bus 110) over the bus 110. However, some embodiments of the GPU 140 communicate with the memory 105 over a direct connection or via other buses, bridges, switches, routers, and the like. The GPU 140 executes instructions stored in the memory 105 and the GPU 140 stores information in the memory 105 such as the results of the executed instructions. For example, the memory 105 stores a copy 145 of instructions that represent a program code that is to be executed by the GPU 140.

A floating-point unit (FPU) 150 supplements the functions of the CPU 115 and the GPU 140. The FPU 150 executes mathematical operations such as addition, subtraction, multiplication, division, other floating-point instructions including transcendental operations, bitwise operations, and the like. The FPU 150 also performs gather operations to bring together data from disparate locations such as a sparse vector 155 stored in the system memory 105. In some embodiments, the gather operation represents the sparse vector 155 using two smaller vectors: (1) a gather vector 160 that includes the populated values from the sparse vector and (2) an index vector 165 that includes the indexes of the populated values in the sparse vector. A conventional FPU uses partial updating to implement the gather operation. However, as discussed herein, partial updating of the gather vector 160 is limited to dispatching a single gather operation per cycle because of exception handling requirements. In order to improve the performance of the processing system 100, the FPU 150 selectively performs gather operations in a first mode or a second mode. In the first mode, multiple subsets of data are concurrently gathered from the memory 105 via multiple load buses implemented in the FPU 150 (not shown in FIG. 1 in the interest of clarity). In the second mode, partial updating is used to gather data from the system memory 105.

Figure 2:
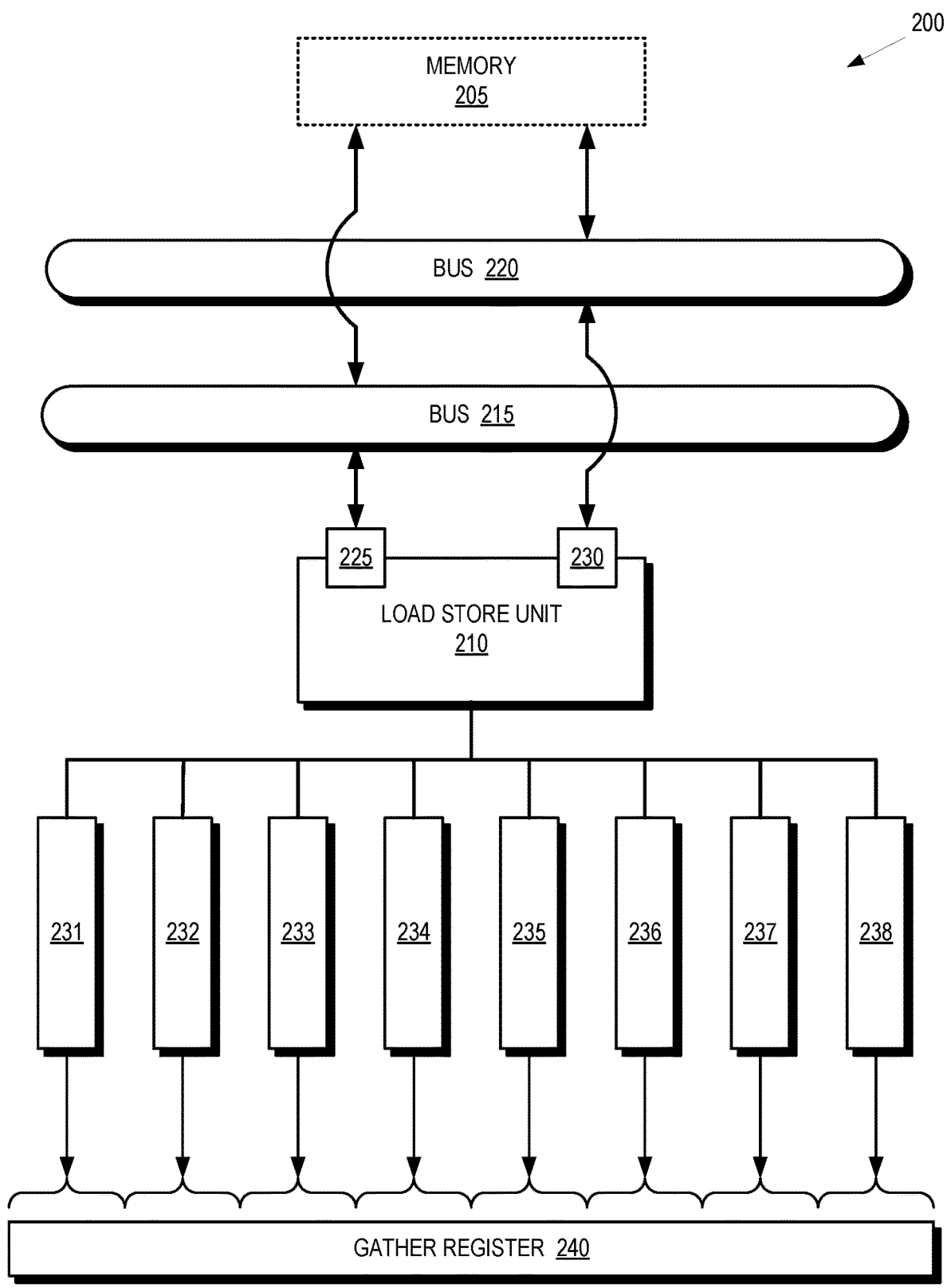
FIG. 2 is a block diagram of a floating point unit (FPU) that supports a multimodal gather operation according to some embodiments.

FIG. 2 is a block diagram of an FPU 200 that supports a multimodal gather operation according to some embodiments. The FPU 200 is used to implement some embodiments of the FPU 150 shown in FIG. 1. The FPU 200 accesses information from a memory 205 such as the system memory 105 shown in FIG. 1. The memory 205 is not necessarily an integral part of the FPU 200, as indicated by the dashed box.

The FPU 200 includes a load store unit 210 that loads data from the memory 205 via a set of load buses. In the illustrated embodiment, the set of load buses in the FPU 200 includes two load buses 215, 220, although the set of load buses includes more load buses in some embodiments. The load store unit 210 includes a set of load ports that correspond to the set of load buses and allow the load store unit 210 concurrent access to the memory 205 via the set of load buses. In the illustrated embodiment, the set of load ports includes two load ports 225, 230 corresponding to the two load buses 215, 220, respectively, although the set of load ports includes more load ports in some embodiments that implement a larger set of load buses.

The FPU 200 also includes a plurality of lanes 231, 232, 233, 234, 235, 236, 237, 238, which are collectively referred to herein as "the lanes 231-238." The lanes 231-238 perform or execute operations or instructions concurrently or in parallel. To perform a gather operation, one or more of the lanes 231-238 accesses data from the memory 205 via the load store unit 210 using addresses or offsets included in the gather operation. The gather operation is selectively performed in either a first mode or a second mode. In the first mode, multiple subsets of data are concurrently gathered from the memory 205 via the multiple load buses implemented in the FPU 200. In the illustrated embodiment, pairs of the lanes 231-238 concurrently gathered data from the memory 205 via the load ports 225, 230 and corresponding buses 215, 220. For example, during a first clock cycle, gather operations are dispatched to the lanes 231, 232, which concurrently gather data from the memory 205 based on addresses or offsets indicated in the operations. For another example, during a second clock cycle subsequent to the first clock cycle, gather operations are dispatched to the lanes 233, 234, which concurrently gather data from the memory 205 based on addresses or offsets indicated in the operations. In the second mode, partial updating is used to gather data from the memory 205. Only one of the buses 215, 220 are used in the second mode and a single gather operation is dispatched per clock cycle.

Data gathered by the gather operations performed by the lanes 231-238 is loaded into corresponding portions of a gather register 240. The lanes 231-238 are therefore mapped to the corresponding portions of the gather register 240. In some embodiments, subsets of the data produced by the lanes 231-238 are gathered into different temporary registers prior to being placed in the gather register 240. The subsets are then merged and placed in the gather register 240 as shown in FIG. 2. For example, the data produced by the lanes 231, 233, 235, 237 is gathered into one temporary register and the data produced by the lanes 232, 234, 236, 238 into another temporary register. The two temporary registers are then merged into the gather register 240 at the end of the operation.

Figure 3:
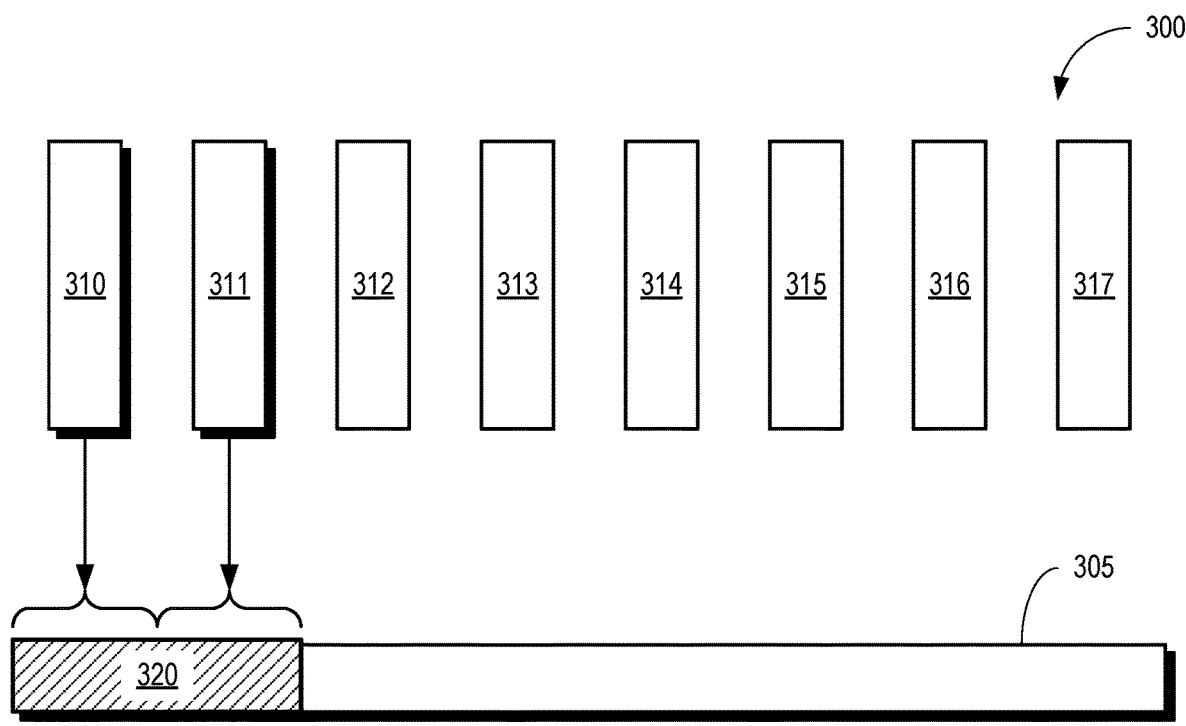
FIG. 3 is a block diagram of states of a register during first and second iterations of a gather operation that is concurrently performed by subsets of lanes in an FPU according to some embodiments.
Figure 3:
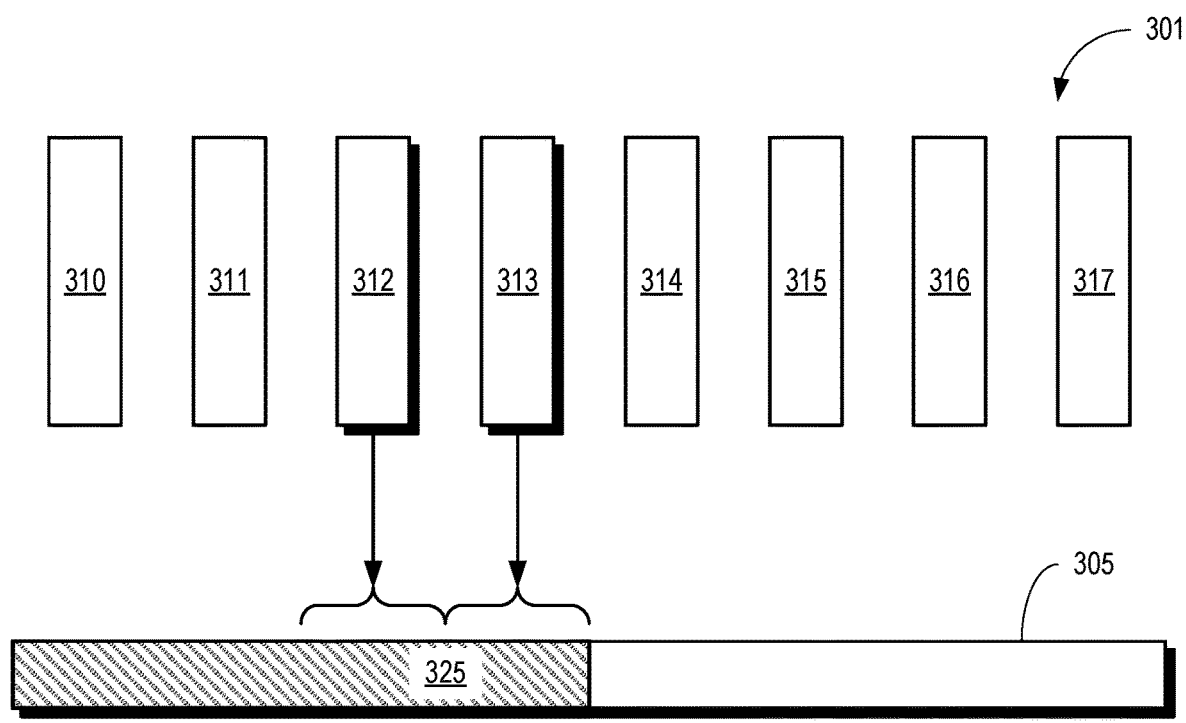

FIG. 3 is a block diagram of states 300, 301 of a register 305 during first and second iterations of a gather operation that is concurrently performed by subsets of lanes in an FPU according to some embodiments. The register 305 is used to implement some embodiments of the gather register 240 shown in FIG. 2. The gather operation is performed by a set of lanes including the lanes 310, 311, 312, 313, 314, 315, 316, 317, which are referred to herein as "the lanes 310-317." In the illustrated embodiment, the FPU includes a load store unit that has a pair of ports that provide concurrent access to a pair of load buses. The lanes 310-317 are therefore partitioned into four subsets that included two lanes each. In the illustrated embodiment, the lanes 310-317 are partitioned into subsets that include an even lane and an odd lane. For example, a first subset includes the lane 310 and the lane 311. However, other partitioning schemes are used in some embodiments, such as high/low partitioning of the lanes 310-317.

Gather operations are dispatched to the first subset during a first clock cycle. In response to dispatch of the gather operations, the lane 310 and the lane 311 concurrently access data at memory locations indicated by an address or offset in the corresponding gather operation. The lanes 310, 311 then load the data into corresponding portions of the register 305, as indicated by the crosshatched region 320. During a second clock cycle subsequent to the first clock cycle, the gather operations are dispatched to a second subset that includes the lanes 312, 313. In response to dispatch of the gather operations, the lane 312 and the lane 313 concurrently access data at memory locations indicated by an address or offset in the corresponding gather operation. The lanes 312, 313 then load the data into corresponding portions of the register 305, as indicated by the crosshatched region 325.

Figure 4:
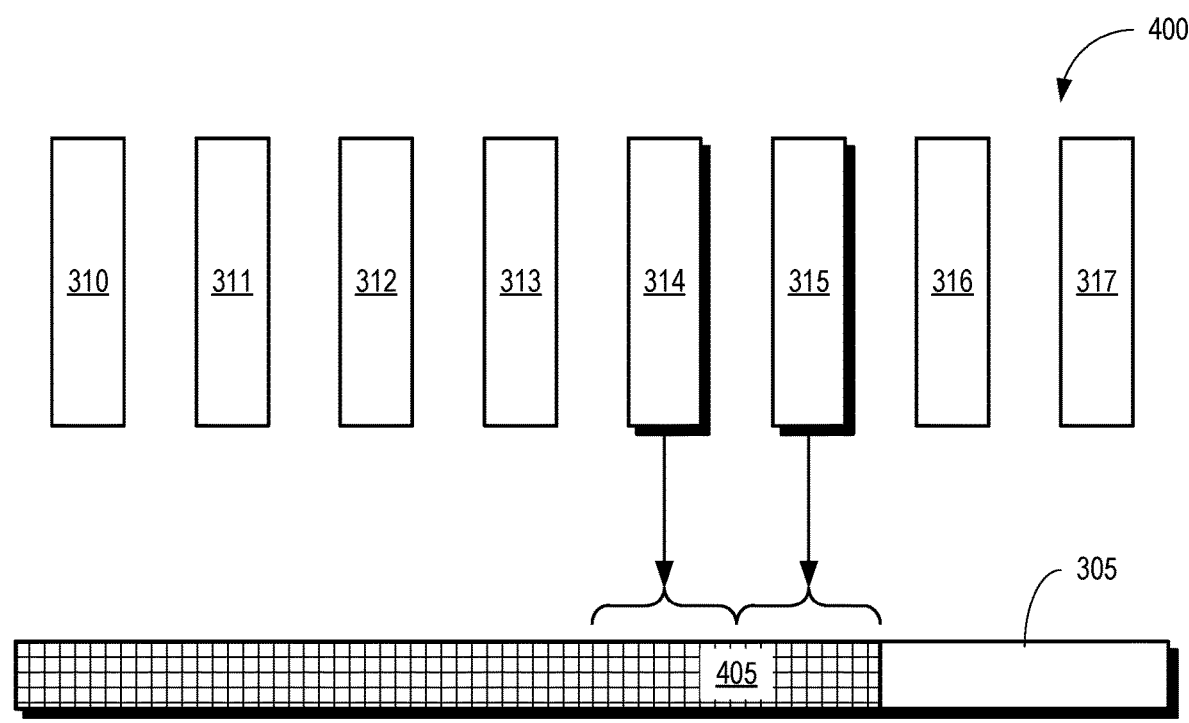
FIG. 4 is a block diagram of states of the register during third and fourth iterations of a gather operation that is concurrently performed by subsets of lanes in an FPU according to some embodiments.
Figure 4:
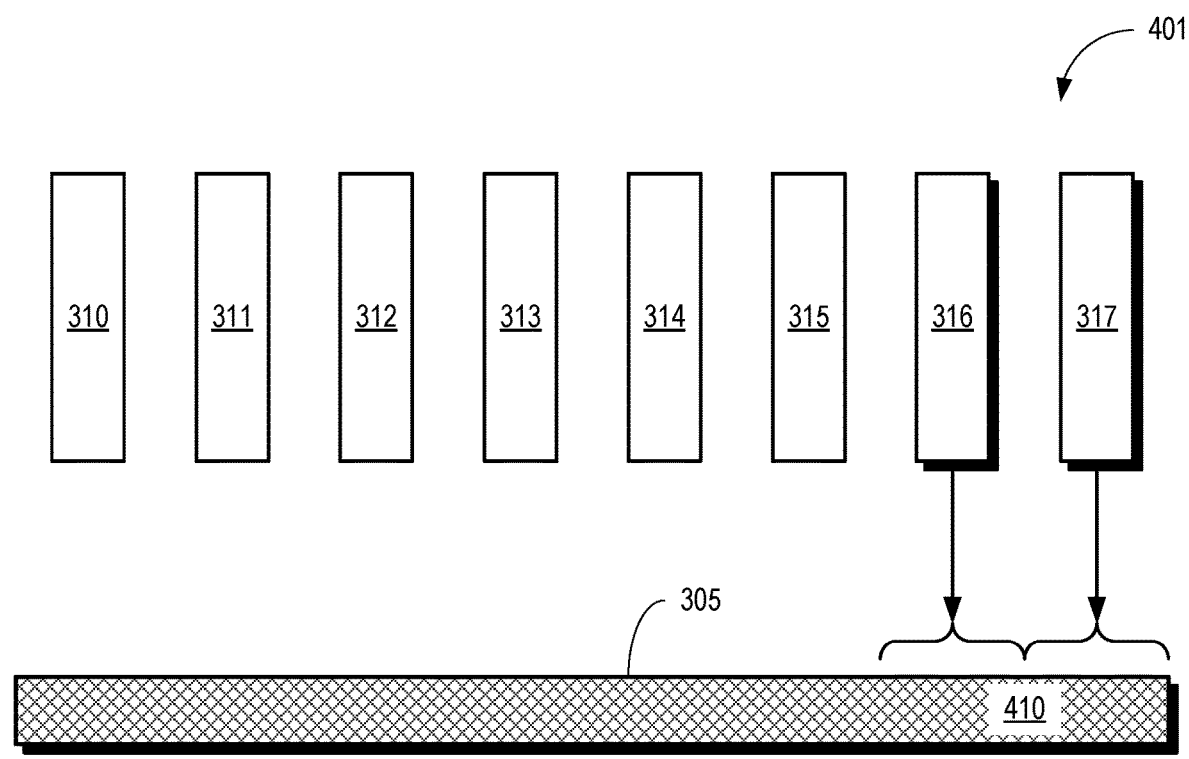

FIG. 4 is a block diagram of states 400, 401 of the register 305 during third and fourth iterations of a gather operation that is concurrently performed by subsets of lanes in an FPU according to some embodiments. The states 400, 401 following the third and fourth iterations of the gather operation are subsequent to the states 300, 301 following the first and second iterations of the gather operation shown in FIG. 3.

During a third clock cycle, gather operations are dispatched to a third subset including the lanes 314 and 315. In response to dispatch of the gather operations, the lane 314 and the lane 315 concurrently access data at memory locations indicated by an address or offset in the corresponding gather operation. The lanes 314, 315 then load the data into corresponding portions of the register 305, as indicated by the crosshatched region 405. During a fourth clock cycle subsequent to the third clock cycle, the gather operations are dispatched to a fourth subset that includes the lanes 316, 317. In response to dispatch of the gather operations, the lane 316 and the lane 317 concurrently access data at memory locations indicated by an address or offset in the corresponding gather operation. The lanes 316, 317 then load the data into corresponding portions of the register 305, as indicated by the crosshatched region 410.

Figure 5:
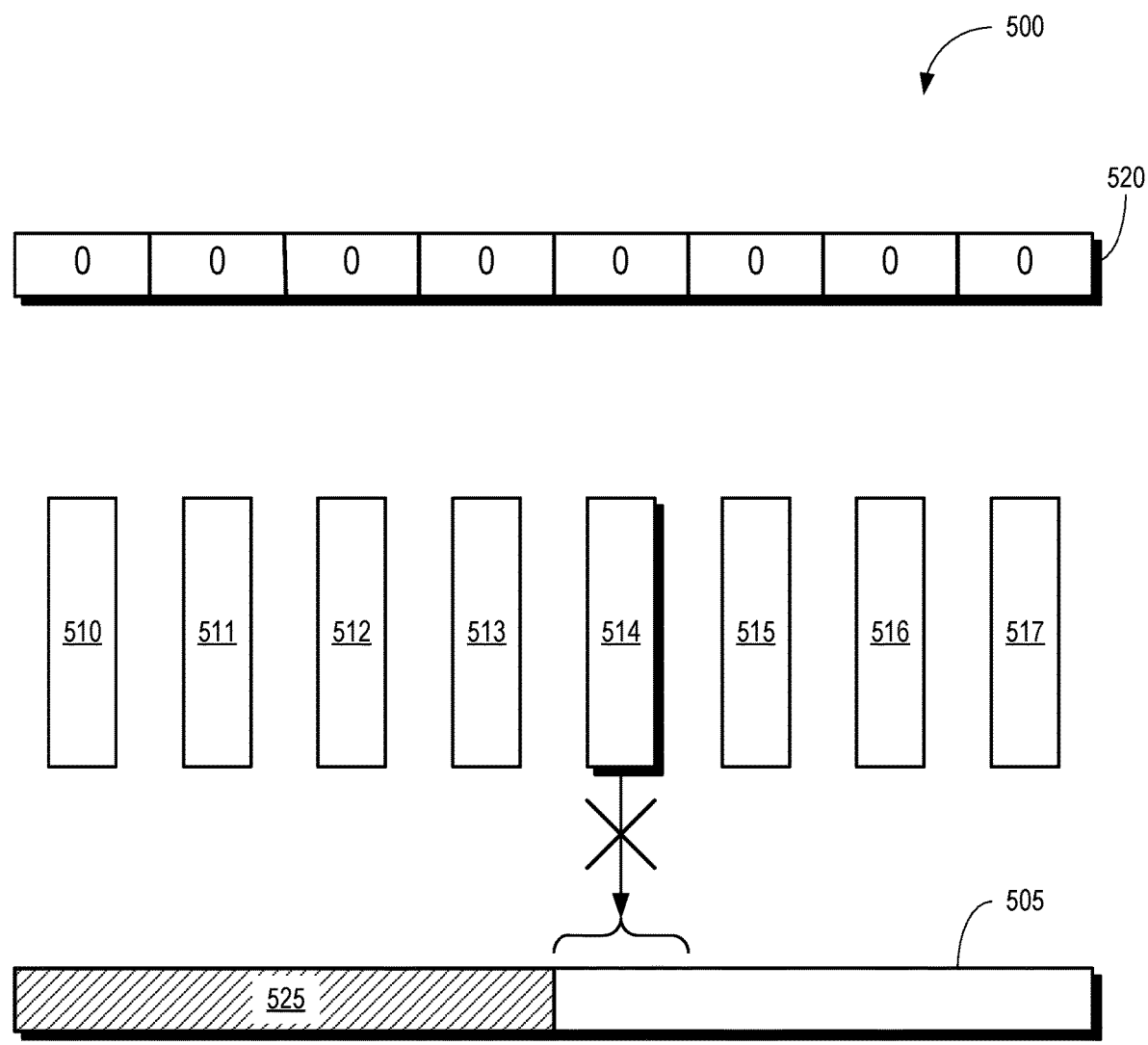
FIG. 5 is a block diagram of a first state of a register during a first iteration of a gather operation that is performed using partial updating according to some embodiments.

FIG. 5 is a block diagram of a first state 500 of a register 505 during a first iteration of a gather operation that is performed using partial updating according to some embodiments. The register 505 is used to implement some embodiments of the gather register 240 shown in FIG. 2. The gather operation is performed by a set of lanes including the lanes 510, 511, 512, 513, 514, 515, 516, 517, which are referred to herein as "the lanes 510-517." During partial updating, the lanes 510-517 access locations in a memory (such as the system memory 105 shown in FIG. 1) one at a time and in order via a load store unit such as the load store unit 210 shown in FIG. 2.

A mask 520 indicates a subset of the lanes 510-517 that are active during an iteration of the partial updating procedure. In the illustrated embodiment, a value of 0 in an entry of the mask 520 indicates that the corresponding lane is active in the value of 1 indicates that the corresponding lane is inactive and does not access the memory during the iteration. The mask 520 indicates that all the lanes 510-517 are active during the first iteration, e.g., using values of 0 in all the entries of the mask 520. Different masking techniques are used in some embodiments.

At the illustrated point of the first iteration of the partial updating procedure, the lanes 510-513 have successfully accessed the corresponding locations in the memory and loaded the data from these locations into the register 505, as indicated by the crosshatched region 525. However, an exception or fault occurred in response to the lane 514 attempting to access a location in the memory and load data from this location into the register 505, as indicated by the cross. An exception handler is invoked to handle the exception before proceeding to a second, subsequent iteration of the partial updating procedure. Furthermore, the entries in the mask 520 are updated to indicate that the lanes 510-513 successfully completed loading data into the corresponding locations of the register 505. As discussed below with regard to FIG. 6, an updated mask 605 indicates that the lanes 510-513 are inactive.

Figure 6:
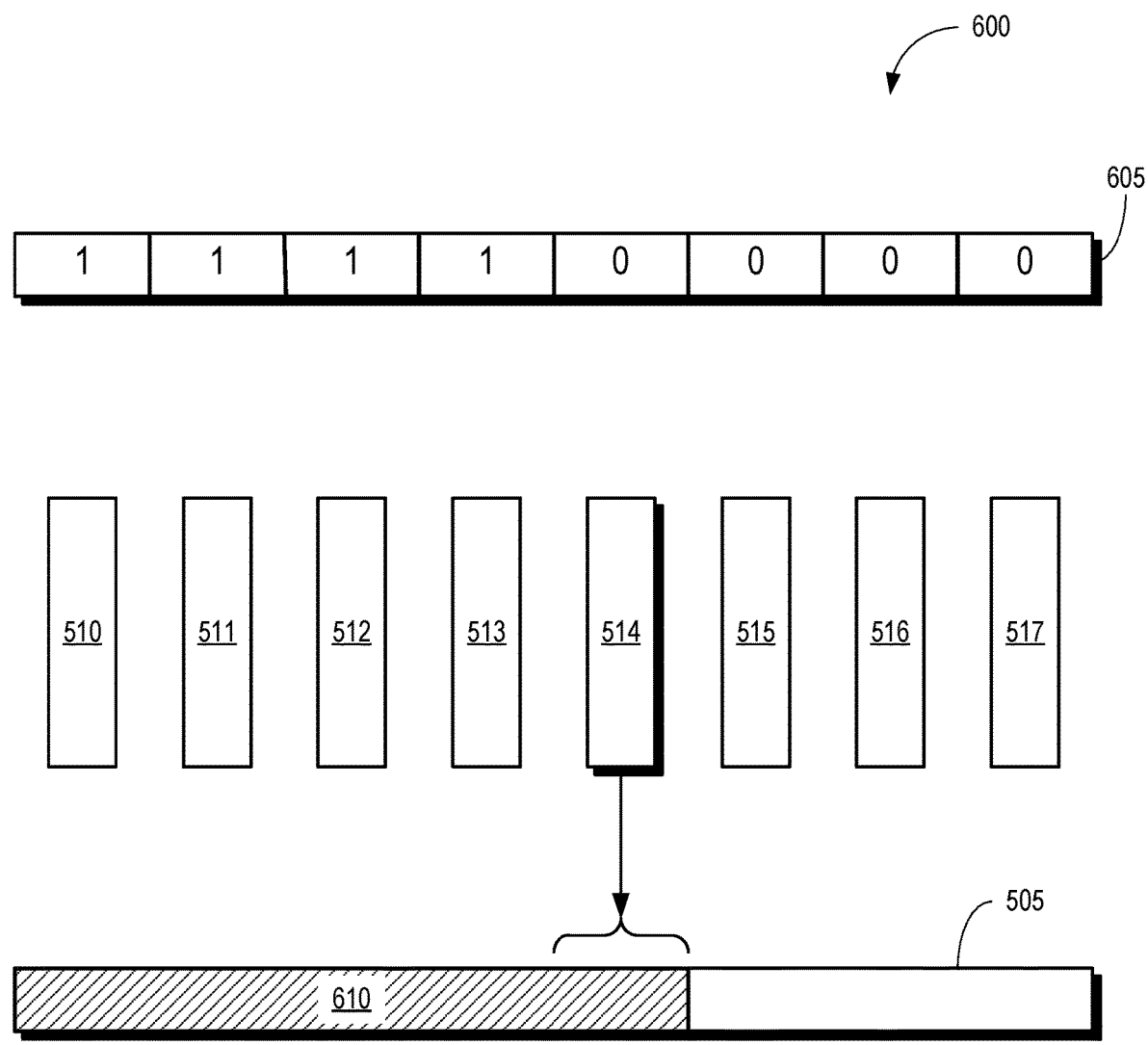
FIG. 6 is a block diagram of a second state of the register during a second iteration of a gather operation that is performed using partial updating according to some embodiments.

FIG. 6 is a block diagram of a second state 600 of the register 505 during a second iteration of a gather operation that is performed using partial updating according to some embodiments. As discussed above, the entries in the updated mask 605 corresponding to the lanes 510-513 are set to values of 1 to indicate that these lanes are inactive because they have successfully loaded information into the register 505 during a previous iteration. The second iteration begins with the lane 514 attempting to access information from the memory and load this information into a corresponding location in the register 505. In the illustrated embodiment, the lane 514 successfully loads the information into the corresponding location in the register 505. This information is added to the information that was previously loaded by the lanes 510-513 in the first iteration, as indicated by the crosshatched region 610. The second iteration continues and subsequent lanes 515-517 attempt to access information from the memory and load this information into corresponding locations in the register 505. If another exception or fault occurs, the second iteration ends and a third iteration begins with an updated mask 520.

Figure 7:
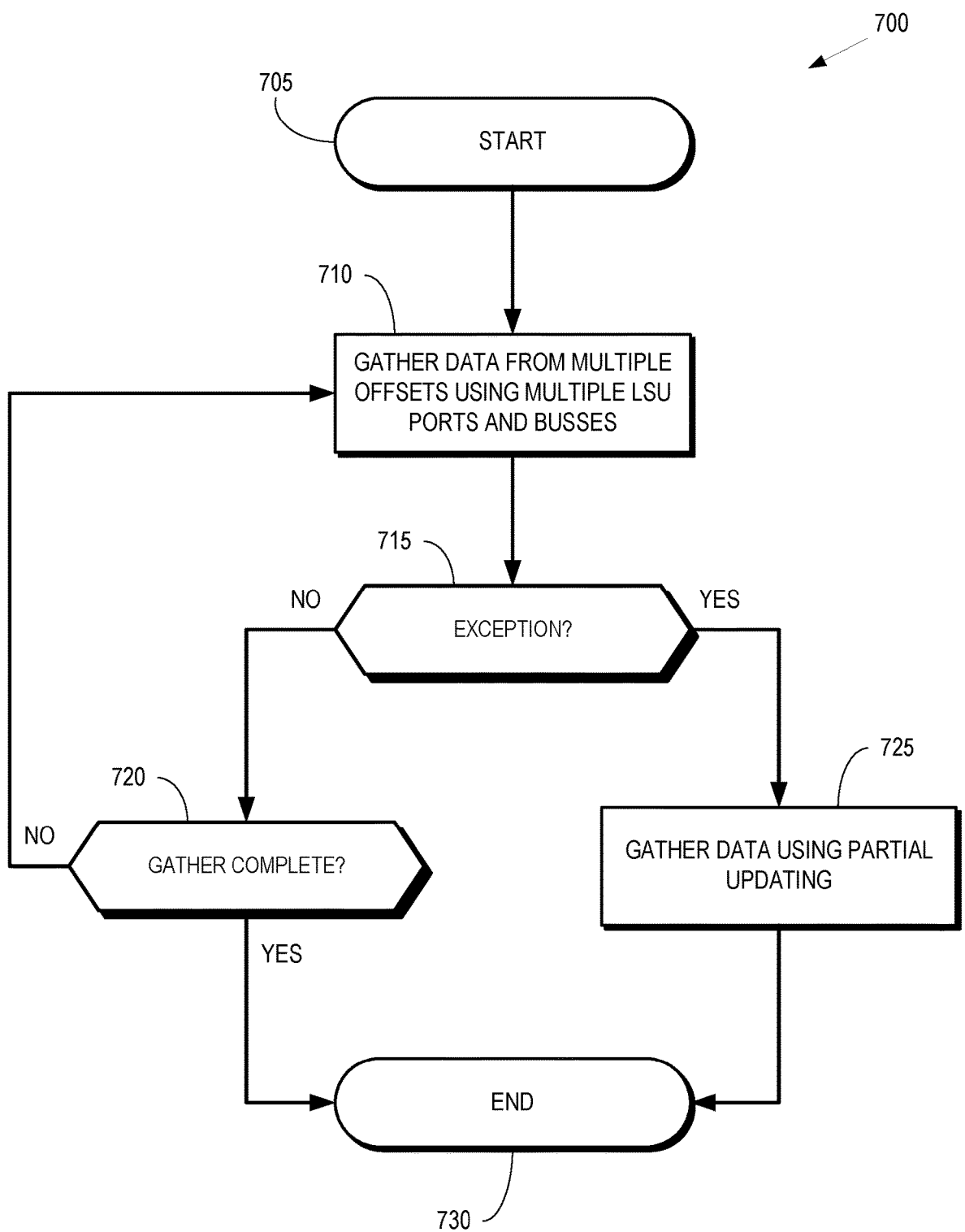
FIG. 7 is a flow diagram of a method of selectively performing a gather operation in a first mode that concurrently gathers multiple subsets of data or a second mode using partial updating according to some embodiments.

FIG. 7 is a flow diagram of a method 700 of selectively performing a gather operation in a first mode that concurrently gathers multiple subsets of data or a second mode using partial updating according to some embodiments. The method 700 is implemented in some embodiments of the FPU 150 shown in FIG. 1 and the FPU 200 shown in FIG. 2.

The method 700 starts at the block 705. Initially, the FPU (e.g., FPU 150 or FPU 200) operates in the first mode. At block 710, the FPU gathers data from multiple offsets in memory using multiple load store unit (LSU) ports and corresponding load buses. In some embodiments, subsets of lanes in the FPU concurrently gathers data from two offsets using two ports in the load store unit (such as the ports 225, 230 shown in FIG. 2) and two corresponding load buses (such as the buses 215, 220 shown in FIG. 2). Gather operations are dispatched to one subset of the lanes in each clock cycle, as discussed herein with regard to FIGS. 3 and 4. The load store unit ignores exceptions or faults while performing the gather operation in the first mode.

At decision block 715, the FPU determines whether an exception or fault occurred while one of the subsets of the lanes was attempting to access the memory. If no exception or fault occurred, the method 700 flows to decision block 720. If an exception or fault occurred in the FPU, the method 700 flows to block 725.

At decision block 720, the FPU determines whether the gather operation is complete. For example, the FPU determines whether the register holding the results of the gather operation is full. If not, the method 700 flows back to block 710 and gather operations are dispatched to another subset of the lanes. If the FPU determines that the gather operation is complete, the method 700 flows to block 730 and the method 700 ends.

At block 725, the FPU switches from the first mode to a second mode and the gather operation is performed using partial updating. In some embodiments, partial updating is performed as discussed herein with regard to FIGS. 5 and 6. Once the partial updating procedure is complete, the method 700 flows to block 730 and the method 700 ends.

In some embodiments, the apparatus and techniques described above are implemented in a system including one or more integrated circuit (IC) devices (also referred to as integrated circuit packages or microchips), such as the FPU that performs multimodal gather operations as described above with reference to FIGS. 1-7. Electronic design automation (EDA) and computer aided design (CAD) software tools are used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code includes instructions, data, or a combination of instructions and data. The software instructions representing a design tool or fabrication tool typically are stored in a computer readable storage medium accessible to the computing system. Likewise, the code representative of one or more phases of the design or fabrication of an IC device is stored in and accessed from the same computer readable storage medium or a different computer readable storage medium.

A computer readable storage medium includes any non-transitory storage medium, or combination of non-transitory storage media, accessible by a computer system during use to provide instructions and/or data to the computer system. Such storage media include, but are not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium can be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above are implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium is in source code, assembly language code, object code, or other instruction format that is interpreted or otherwise executable by one or more processors.

Note that not all the activities or elements described above in the general description are required, that a portion of a specific activity or device may not be required, and that one or more further activities are performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter can be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above can be altered or modified and all such variations are considered within the scope of the disclosed subject matter. Accordingly, the protection sought herein is as set forth in the claims below.

What is claimed is:

1. An apparatus comprising:
   a plurality of load buses;
   a load store unit comprising a plurality of load ports to access the plurality of load buses, wherein the load store unit is configured to perform a gather operation to concurrently gather, based on a memory address, a plurality of subsets of data from a memory via the plurality of load buses in a first mode, wherein the gather operation iteratively loads data via each of the plurality of load buses in the first mode until the gather operation is complete in response to no exceptions or faults being generated during the gather operation; and
   a register that is partitioned into a plurality of portions to hold the plurality of subsets of data provided by the load store unit.

2. The apparatus of claim 1, wherein the load store unit comprises a plurality of lanes that is partitioned into lane subsets that are configured to concurrently execute the gather operation to gather the plurality of subsets of data.

3. The apparatus of claim 2, wherein the load store unit includes two load ports and two load buses, and wherein the plurality of lanes is partitioned into even lane subsets and odd lane subsets.

4. The apparatus of claim 3, wherein gather operations are dispatched to two lanes to concurrently perform the gather operation per clock cycle in the first mode.

5. The apparatus of claim 1, wherein the load store unit is configured to ignore exceptions or faults while performing the gather operation in the first mode.

6. The apparatus of claim 5, wherein the load store unit is configured to transition from the first mode to a second mode in response to an exception or fault occurring while performing the gather operation.

7. The apparatus of claim 6, wherein the load store unit is configured to perform the gather operation in order by a plurality of lanes based on a mask that indicates lanes that successfully gathered data and stored the successfully gathered data in the register in a previous iteration of the second mode.

8. The apparatus of claim 7, wherein the gather operation is dispatched to a single lane to perform the gather operation per clock cycle in the second mode.

9. A method comprising:
concurrently gathering, at a load store unit in a floating-point unit (FPU) that is operating in a first mode, a plurality of subsets of data from a memory via a plurality of load buses implemented in the FPU, wherein gathering comprises performing a gather operation for iteratively loading data via each of the plurality of load buses based on a memory address until the gather operation is complete in response to no exceptions or faults being generated during the gathering; and
storing the plurality of subsets of data in a register that is partitioned into a plurality of portions to hold the plurality of subsets of data provided by the load store unit.

10. The method of claim 9, wherein concurrently gathering the plurality of subsets of the data comprises concurrently executing the gather operation on a plurality of lanes that is partitioned into lane subsets that are configured to concurrently execute the gather operation to gather the plurality of subsets of data.

11. The method of claim 10, wherein the load store unit includes two load ports and two load buses, and wherein the plurality of lanes is partitioned into even lane subsets and odd lane subsets.

12. The method of claim 11, further comprising:
dispatching gather operations to two lanes to concurrently perform the gather operation per clock cycle.

13. The method of claim 9, further comprising:
ignoring exceptions or faults while performing the gather operation in the first mode.

14. The method of claim 13, further comprising:
transitioning the load store unit from the first mode to a second mode in response to an exception or fault occurring while performing the gather operation.

15. The method of claim 14, further comprising:
performing the gather operation in order by a plurality of lanes based on a mask that indicates lanes that successfully gathered data and stored the successfully gathered data in the register in a previous iteration of the second mode.

16. The method of claim 15, further comprising:
dispatching the gather operation to a single lane to perform the gather operation per clock cycle.

17. An apparatus comprising:
a plurality of load buses;
a load store unit configured to perform a gather operation selectively in a first mode or a second mode, wherein the load store unit is configured to concurrently gather, based on a memory address, a plurality of subsets of data from a memory via the plurality of load buses in the first mode, wherein the gather operation iteratively loads data via each of the plurality of load buses until the gather operation is complete in response to no exceptions or faults being generated during the gather operation, and wherein the load store unit is configured to gather the plurality of subsets of data from the memory using partial updating in the second mode; and
a register configured to store the plurality of subsets of data provided by the load store unit.

18. The apparatus of claim 17, wherein the load store unit ignores exceptions or faults while performing the gather operation in the first mode.

19. The apparatus of claim 18, wherein the load store unit transitions from the first mode to the second mode in response to an exception or fault occurring while performing the gather operation in the first mode.

20. The apparatus of claim 19, wherein two lanes are dispatched to concurrently perform the gather operation per clock cycle in the first mode and a single lane is dispatched to perform the gather operation per clock cycle in the second mode.

* * * * *